Sept. 22, 1953                    W. B. PERKINS                    2,652,625
                          COIL SPRING COMPRESSING DEVICE
Filed May 13, 1950                                           2 Sheets-Sheet 1
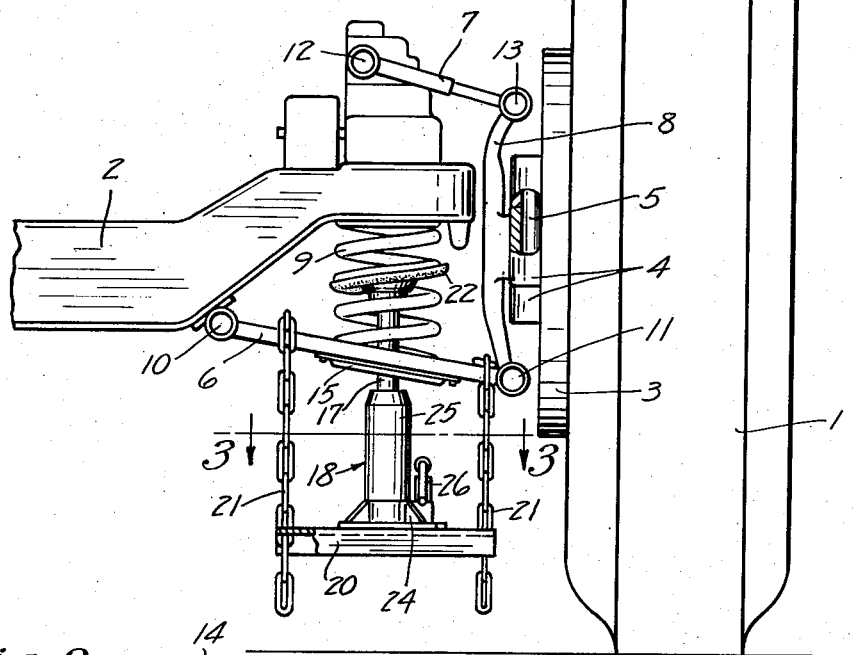
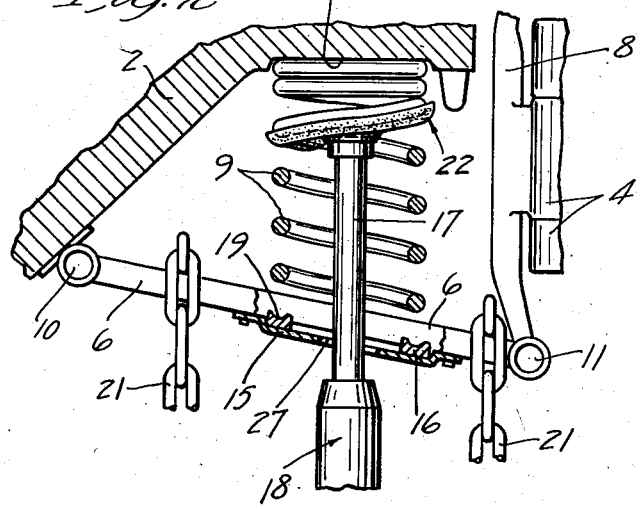
Inventor
W. B. Perkins
By his Attorneys
Merchant & Merchant Sept. 22, 1953  W. B. PERKINS  2,652,625
COIL SPRING COMPRESSING DEVICE
Filed May 13, 1950  2 Sheets-Sheet 2
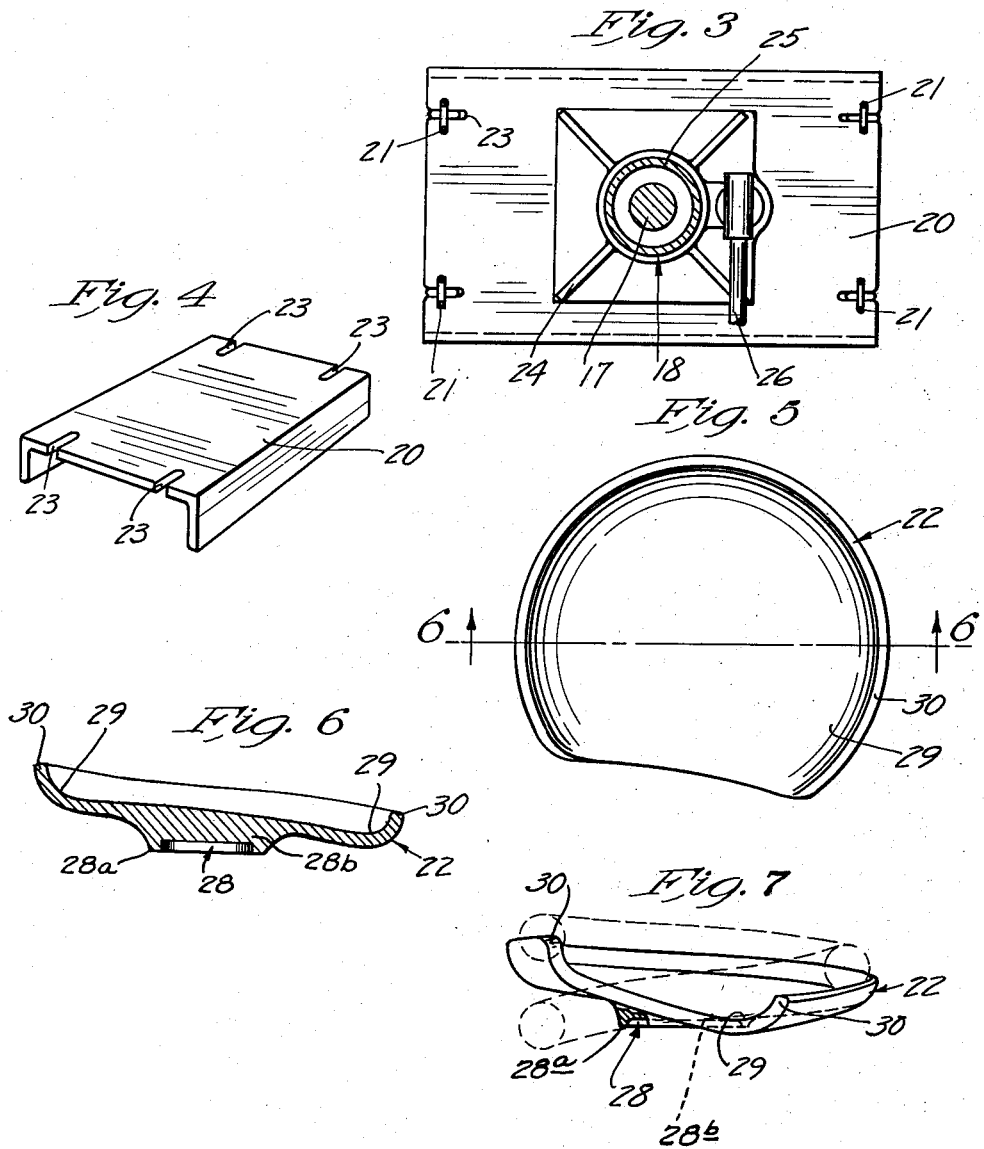
Inventor
W. B. Perkins
By his Attorneys
Merchant & Merchant Patented Sept. 22, 1953

2,652,625

UNITED STATES PATENT OFFICE 2,652,625

COIL SPRING COMPRESSING DEVICE

W. B. Perkins, St. Paul, Minn., assignor to
Henry H. Graham, Minneapolis, Minn.

Application May 13, 1950, Serial No. 161,850

1 Claim. (Cl. 29—283)

Generally stated, my invention relates to improvements in apparatus for use in the compressing of coil springs of the general character conventionally employed for wheel suspension in the automotive industry. In a more specific sense, my invention relates to an improved device in the nature of a plate for transferring the force of a jack or other prime mover extended axially into the spring to a longitudinally-intermediate portion of the spring.

A primary object of the invention is the provision of improved devices of the class and for the purpose described whereby such springs may be readily, safely and economically compressed to allow insertion of shims between the ends of the springs and the seats thereof without removing or detaching the springs from the vehicle.

The above and highly important objects and advantages of the invention will be made apparent from the following specification, claim and appended drawings.

In the accompanying drawings, like characters indicate like parts throughout the several views.

Referring to the drawings:

Fig. 1 is a fragmentary view in front elevation of part of an automobile undercarriage or chassis showing a preferred form of my invention applied thereto for the purpose of compressing a wheel suspending spring;

Fig. 2 is an enlarged fragmentary view corresponding to Fig. 1 but with some parts broken away or omitted and some parts shown in section;

Fig. 3 is a horizontal sectional view taken on the line 3—3 of Fig. 1;

Fig. 4 is a perspective view of a platform used as a base of reaction for the base end of the jack employed in connection with the invention;

Fig. 5 is a plan view of a preferred form of plate embodying the invention;

Fig. 6 is a transverse sectional view taken on the line 6—6 of Fig. 5; and

Fig. 7 is a view in side elevation with some parts broken away and some parts shown in section of the plate of Figs. 5, 6 and others.

Conventional automotive structure shown particularly in Figs. 1 and 2 comprises a tire-equipped front wheel 1, the front section of a vehicle frame 2, the usual brake drum 3, a steering knuckle or joint 4, including the usual spindle bolt 5, lower control arms 6, upper control arms 7, a rigid steering knuckle-supporting link or arm 8, and a conventional wheel suspending coil spring 9. In accordance with usual practice, the inner ends of the control arms 6 are pivoted to the vehicle frame 2 at 10 and the outer ends thereof are pivoted to the lower end of the knuckle-supporting link 8 at 11. Also, in accordance with conventional practice, the upper control arms 7 are pivoted to the vehicle frame 2 at 12 and to the upper end of the knuckle-supporting arm or link 8 at 13. The coil spring 9 is of the conventional uniform diameter type, such as may be produced by spirally or helically winding suitable wire on a cylinder, the spring illustrated comprising a plurality of 360° turns or convolutions. In the structure illustrated, the frame structure 2 is formed to provide a seat 14 for the upper end of the spring 9 and the lower end of the spring 9 is seated in or against a spring seating plate 15 secured to the undersides of and spanning the space between the lower control arms 6.

As previously indicated, one of the important reasons for compressing automotive springs is to allow insertion between an end thereof and a seat therefor of a suitable shim; such shims being commonly employed to compensate for excessive sagging of the spring as a result of prolonged usage or overloading. In Fig. 2 of the accompanying drawings, such a shim ring is shown at 16 and this shim may be assumed to be circumferentially split to receive a spindle or shaft 17 of a suitable prime mover, such as a jack 18, comprising part of the spring compressing apparatus. In Fig. 2, the split shim ring 16 is seated in the spring seat of plate 15 and is provided in its upper surface with a cross-sectionally concave spring seat 19.

The spring compressing apparatus herein illustrated comprises the prime mover 18 which is in the nature of a conventional hand-operated hydraulic jack, a platform 20 used as a support or base of reaction for the base of the primer mover or jack 18, suspension chains 21 for the platform 20, and the plate indicated by 22 and forming the primary subject matter of the instant invention. The platform 20 is a channel-like structure provided at its opposite ends with chain-link-receiving notches 23. The platform-supporting chains 21 are looped over the lower control arms 6 to form inverted U's and are detachably anchored to the platform 20 by interlocking suitable links thereof in the platform channels 23.

The prime mover or jack 18 comprises a base 24, a hydraulic cylinder 25, the spindle or shaft 17 which extends through the upper end of the cylinder 18 and serves as a plunger, and a suitable high pressure pumping mechanism 26.

The plate 22 serves as a base of reaction for the upper or head end of the jack shaft or spindle 17 and transfers the pressure of the jack to a longitudinally-intermediate convolution of the helical coil spring 9. The jack shaft or spindle 17 extends axially upwardly into the spring 9 through an axial recess 27 in the spring seating plate 15, and the head end thereof is seated in an axially-located downwardly-opening socket-forming recess 28 in plate 22. This recess 28 is defined by a marginal flange 28a and a flat jack-seating surface 28b that is so disposed with respect to the helical spring seating upper surface 29 that it is substantially perpendicular to the axis of the coil spring 9 when the helical spring seating surface 29 is seated against an intermediate convolution of said spring. This plate 22 is formed to provide a generally helical spring seat 29 which bears against the undersurface of a major portion of one convolution of the spring 9; this spring seat 29 being less than 360° in extent to allow extension thereby of a portion of the seated spring convolution extending to the next subjacent spring convolution, but being of more than 180° in extent in order to engage and support as much of one spring convolution as possible. In practice, it is desirable to make the pitch of the helical seat 29 approximate as closely as possible the pitch of the intermediate convolutions of the particular springs to be compressed when the latter are in a state of partial compression, so as to assure maximum possible contact between the helical seat 29 and the overlying portion of the spring 9. In order to positively lock the plate 22 against lateral slippage from its operative position on the spring 9 and as shown in Figs. 1 and 2, the said plate is preferably provided at its peripheral portion and immediately adjacent the helical seat 29 with an upstanding retaining flange portion 30, which is preferably also of helical contour and embraces a side of the seated convolution of spring 9.

The plate 22 is readily applied by inserting laterally between adjacent intermediate convolution of spring 9, after which the head end of the jack shaft or spindle 17 is applied in the axial socket 28 and against the closed end thereof. Once the spring compressing apparatus has been applied, as shown in Figs. 1 and 2, that portion of the spring lying above the plate 22 is readily compressed by operation of the jack 18 to raise the lower end thereof of the seating plate 15 sufficiently to allow insertion of a suitable shim or spacer ring 19, and during this entire operation the plate 22 will be positively locked against lateral displacement from the spring and the head of the jack will be positively locked against a lateral displacement from the socket 28 of plate 22, which makes for maximum safety during the entire operation.

While in the above specification I have described one embodiment which my invention may assume in practice, it will of course, be understood that the same is capable of modification and that modification may be made without departing from the spirit and scope of the invention as expressed in the following claim.

What I claim is:

A device for use in the compression of coil springs of the character employed for wheel suspension in automobiles, said device comprising a plate adapted to serve as a base of reaction for a spring compressing jack and having a generally helical spring seating upper surface adapted to seat against the helical surface of a portion of a spring convolution intermediate the ends of the spring, said generally helical seat being of more than 180° in extent and of less than 360° in extent to allow the extension thereby of a portion of a seated spring convolution extending to an adjacent spring convolution, said plate including a central body and a marginal helical flange, the said flange and adjacent portion of said body providing said helical seating surface and being curved axially of the plate for general conformity with the circumferential contour of the portion of the spring convolution seatable therein, said plate being closed at its axis and said closed axial portion having a flat jack-seating undersurface that is so angularly disposed with respect to the helical spring seating upper surface that it will be substantially perpendicular to the axis of a coil spring when the helical seating surface is seated against an intermediate convolution of the spring.

W. B. PERKINS.

References Cited in the file of this patent
UNITED STATES PATENTS

| Number | Name | Date |
| --- | --- | --- |
| 1,008,694 | Bryant | Nov. 14, 1911 |
| 1,245,667 | Bousfield | Nov. 6, 1917 |
| 1,298,253 | Peterson | Mar. 25, 1919 |
| 1,368,501 | Huddle | Feb. 15, 1921 |
| 1,494,564 | Piasecki | May 20, 1924 |
| 2,240,897 | Styles | May 6, 1941 |
| 2,467,332 | Monteith | Apr. 12, 1949 |